No. 864,783. PATENTED SEPT. 3, 1907.
H. A. HANCOCK.
STRAW BINDER.
APPLICATION FILED OCT. 27, 1906.

7 SHEETS—SHEET 1.

Witnesses
Frank A. Fahle
Thomas W. McMeans

Inventor
Harry A. Hancock
By
Bradford Hood
Attorneys

No. 864,783. PATENTED SEPT. 3, 1907.
H. A. HANCOCK.
STRAW BINDER.
APPLICATION FILED OCT. 27, 1906.

7 SHEETS—SHEET 2.

Witnesses
Frank A. Fahle
Thomas H. McMeans

Inventor.
Harry A. Hancock
BY
Bradford Hood.
Attorney

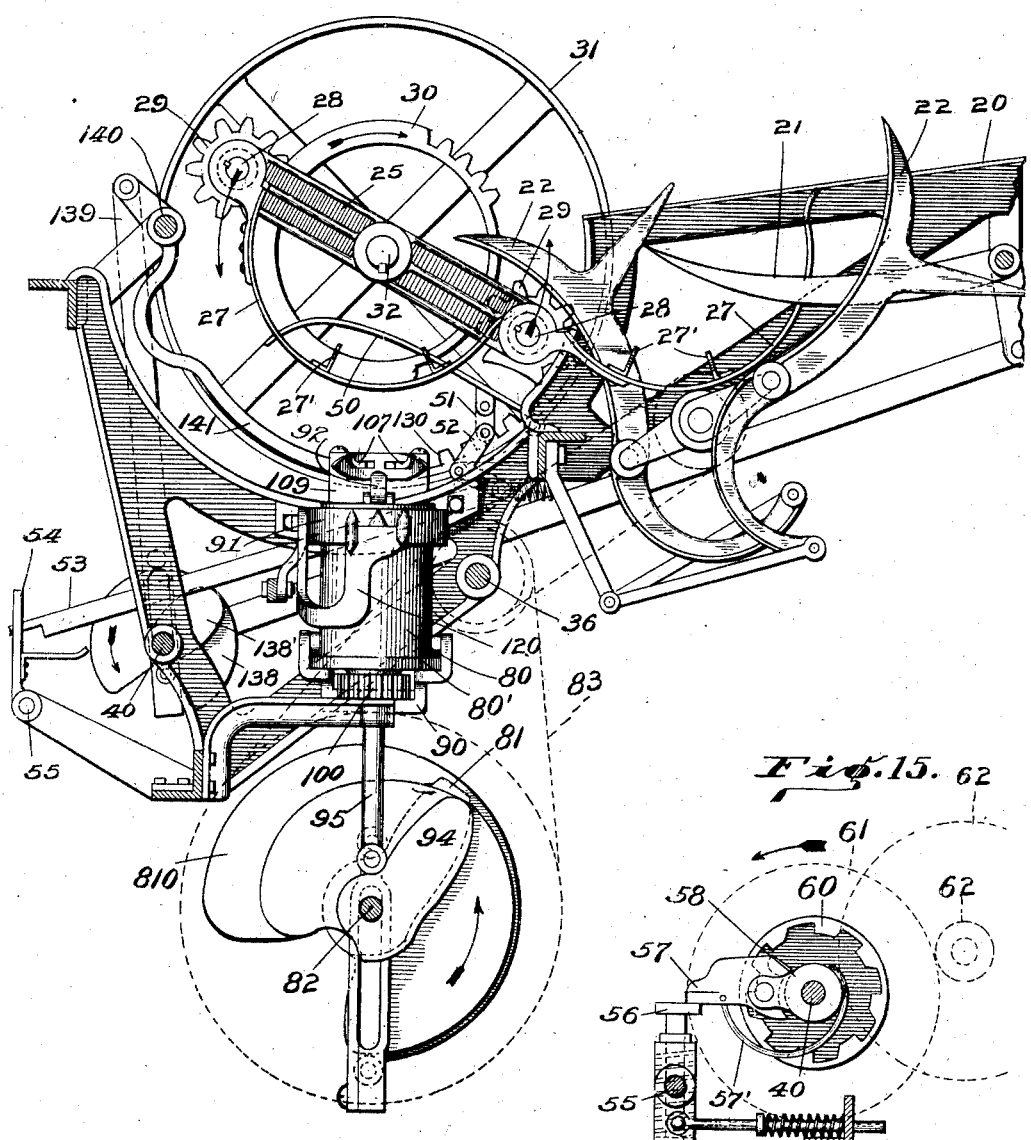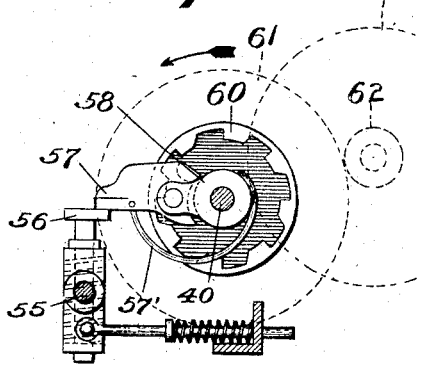

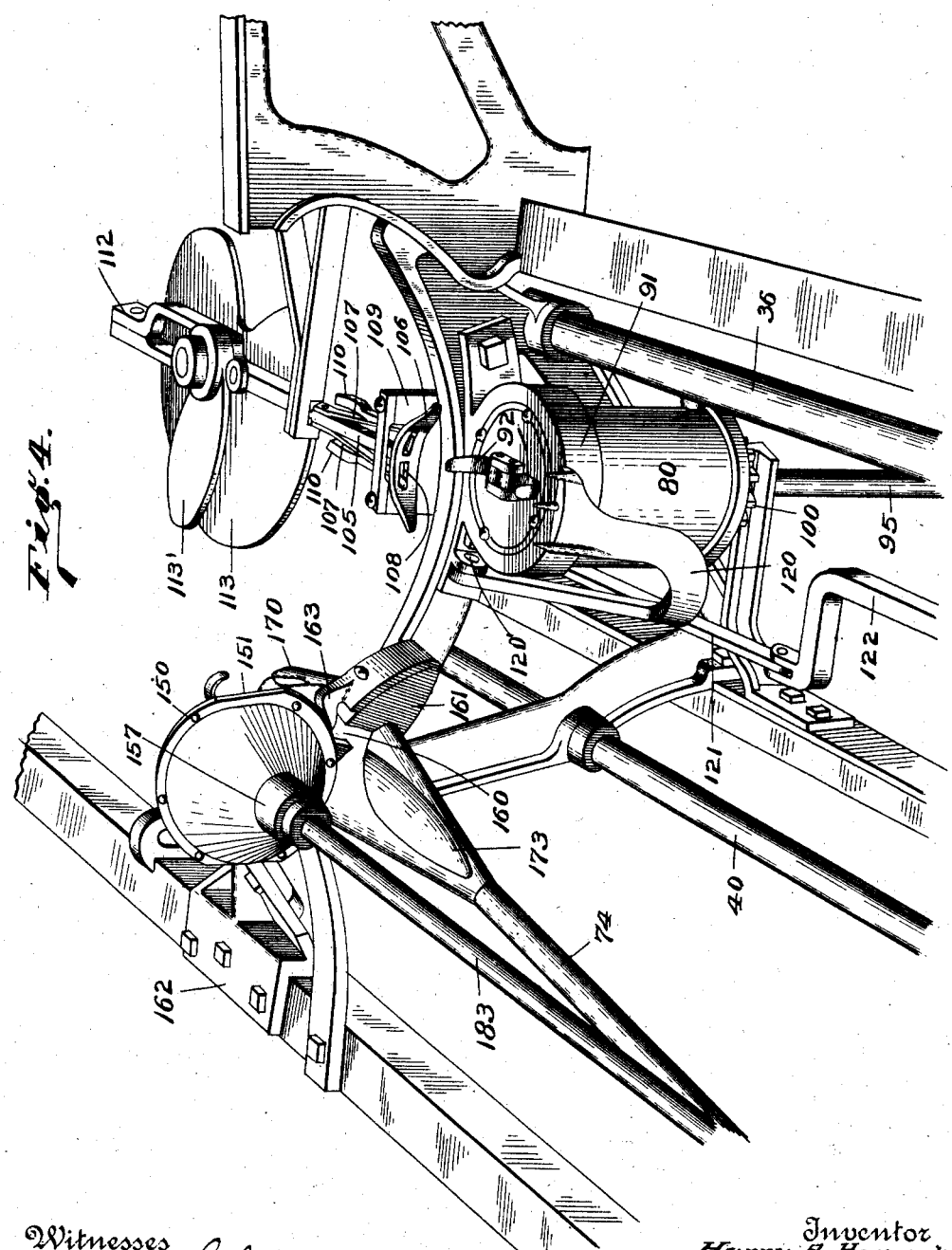

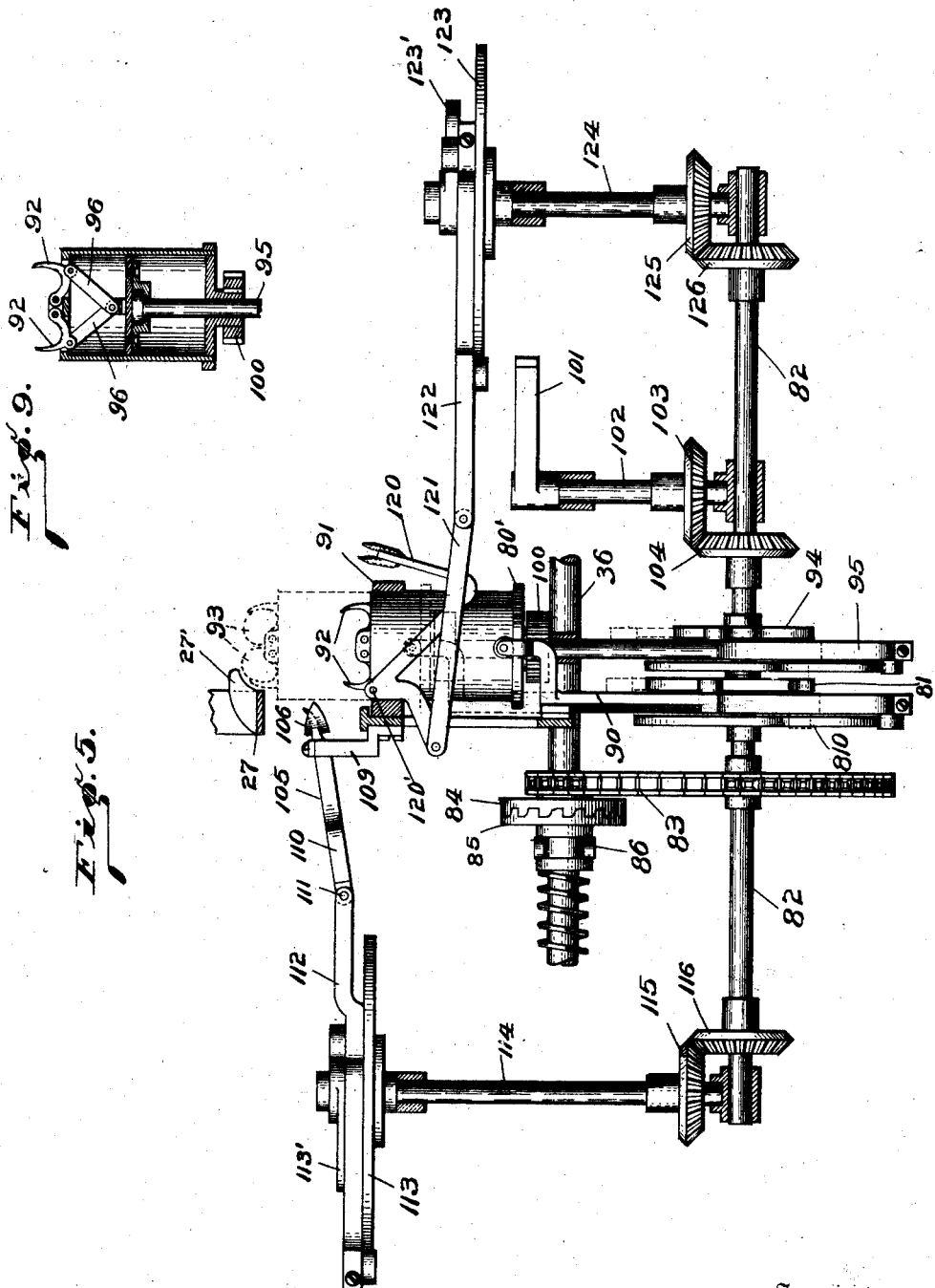

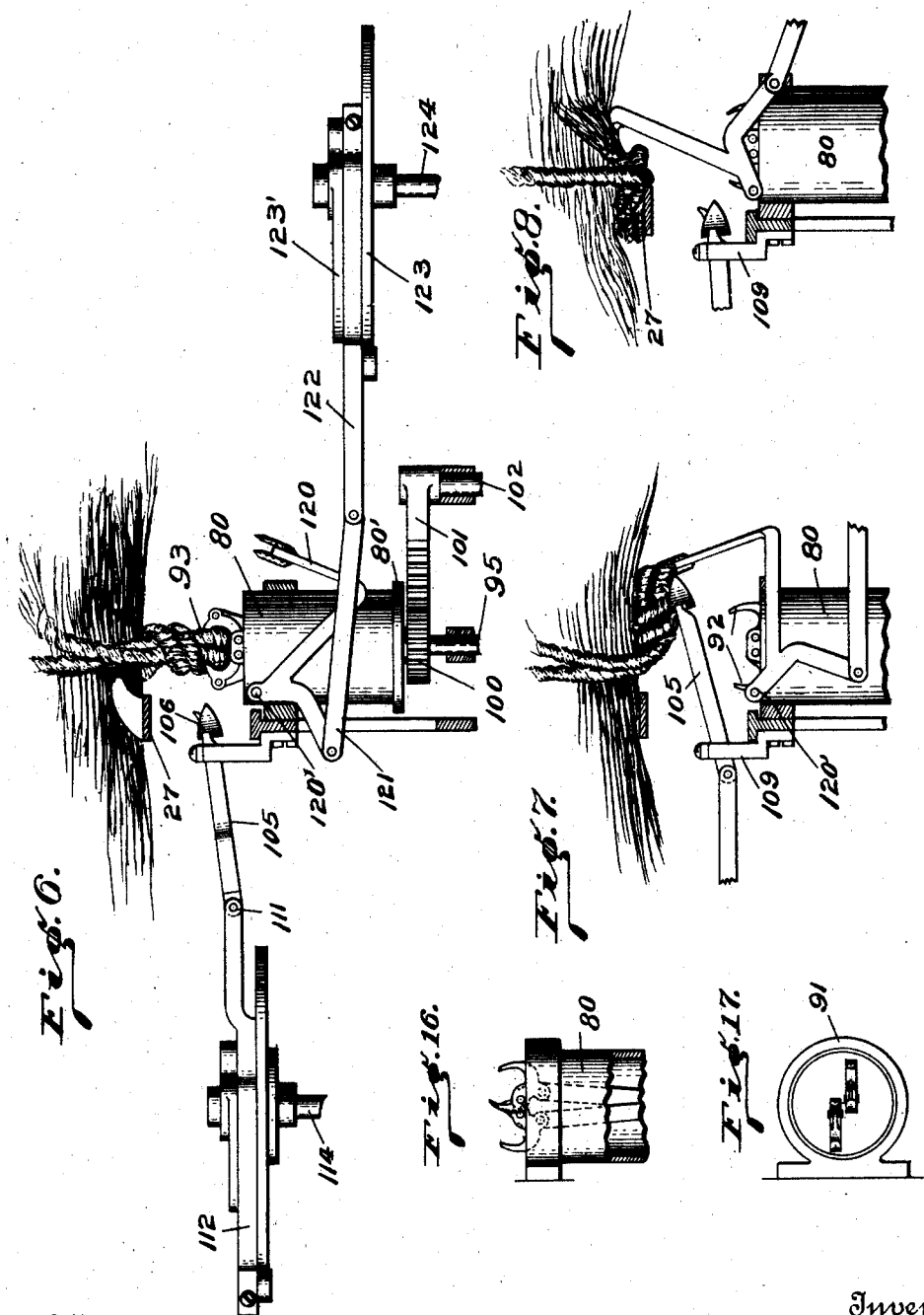

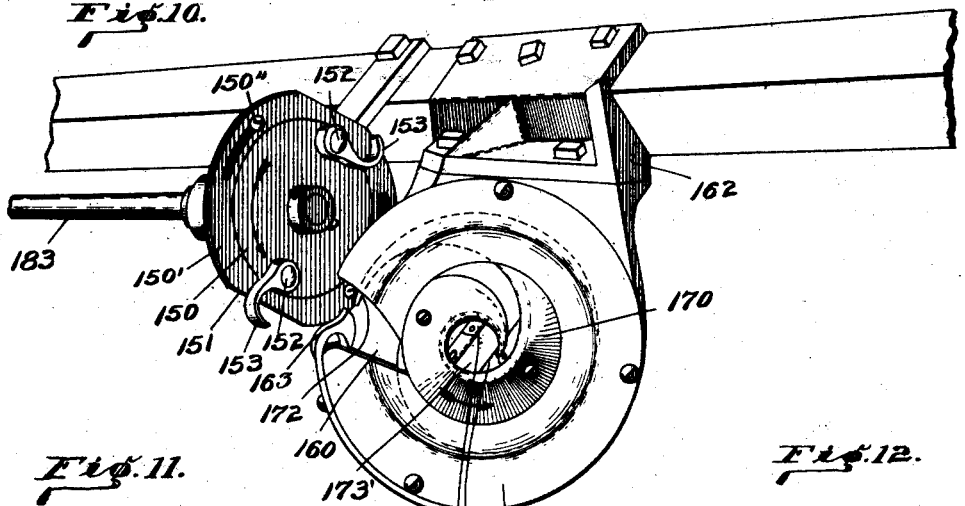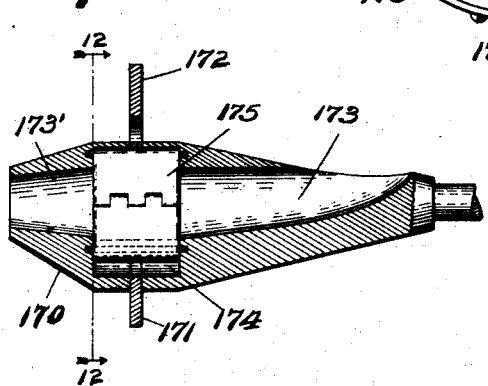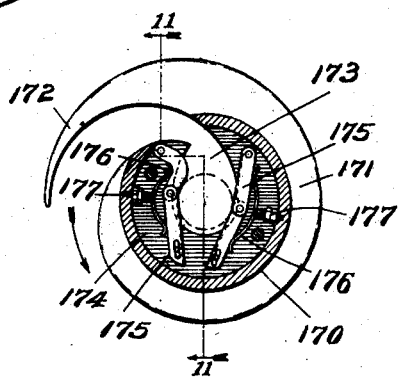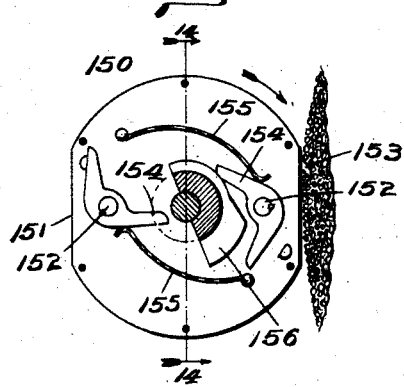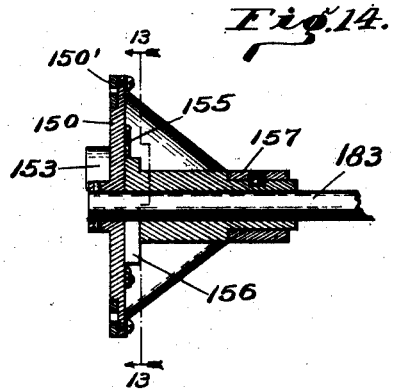

UNITED STATES PATENT OFFICE.

HARRY A. HANCOCK, OF INDIANAPOLIS, INDIANA, ASSIGNOR TO THE BROWN STRAW BINDER COMPANY, OF INDIANAPOLIS, INDIANA, A CORPORATION OF INDIANA.

STRAW-BINDER.

No. 864,783.  Specification of Letters Patent.  Patented Sept. 3, 1907.

Application filed October 27, 1906. Serial No. 340,872.

*To all whom it may concern:*

Be it known that I, HARRY A. HANCOCK, a citizen of the United States, residing at Indianapolis, in the county of Marion and State of Indiana, have invented certain new and useful Improvements in Straw-Binders, of which the following is a specification.

The object of my invention is to produce a mechanism adapted to receive a straw crop, such as wheat, oats, barley and the like, and bind the same into bundles by means of a binding rope formed from the straw of the bundles, and my present invention relates more particularly to the mechanism for extracting a desired quantity of the butt ends of straws from the bundle and forming the same into a binding rope, and mechanism for associating the opposite ends thereof in such manner that they will be held permanently in position.

Figure 1:
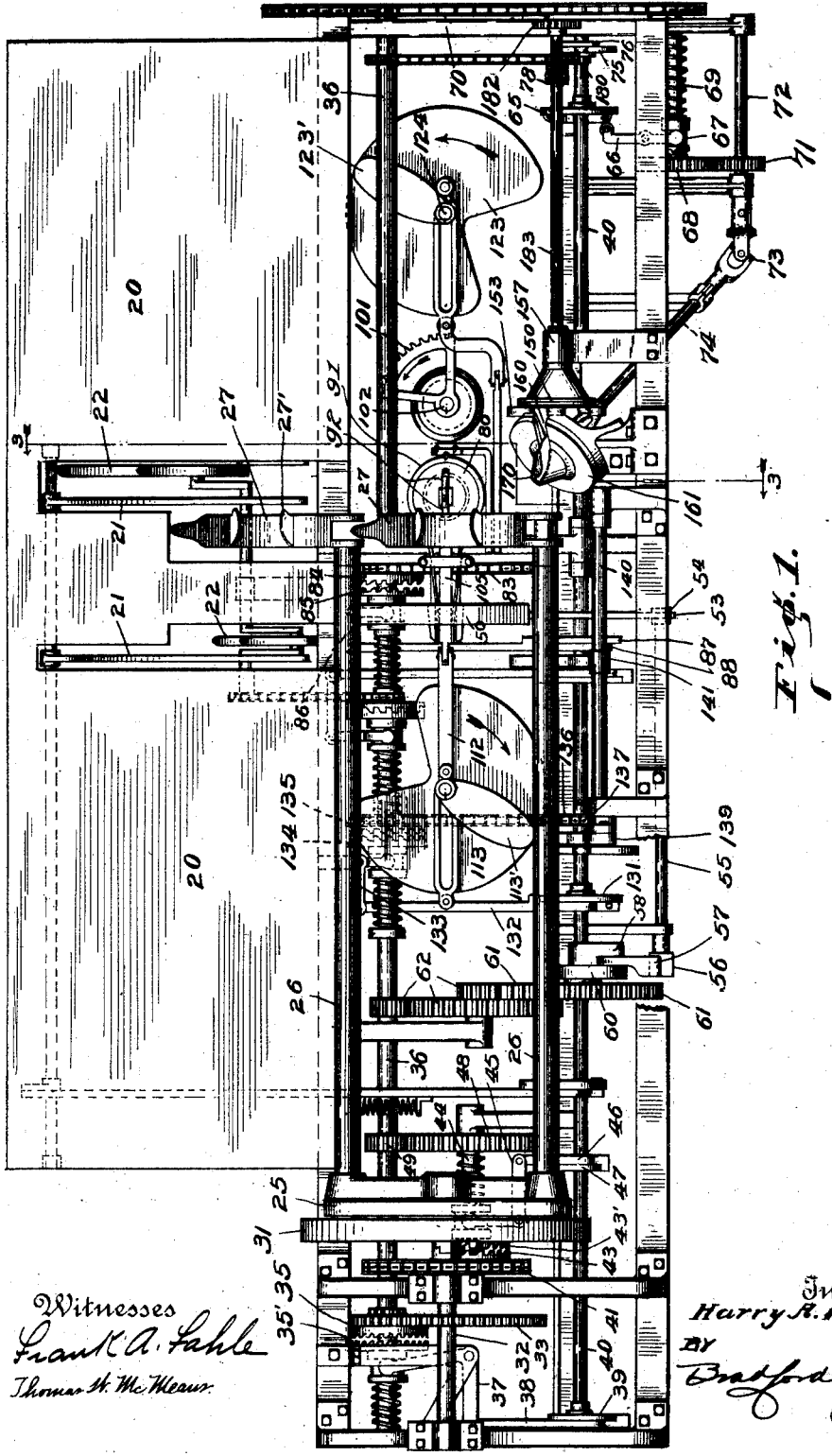
Figure 2:
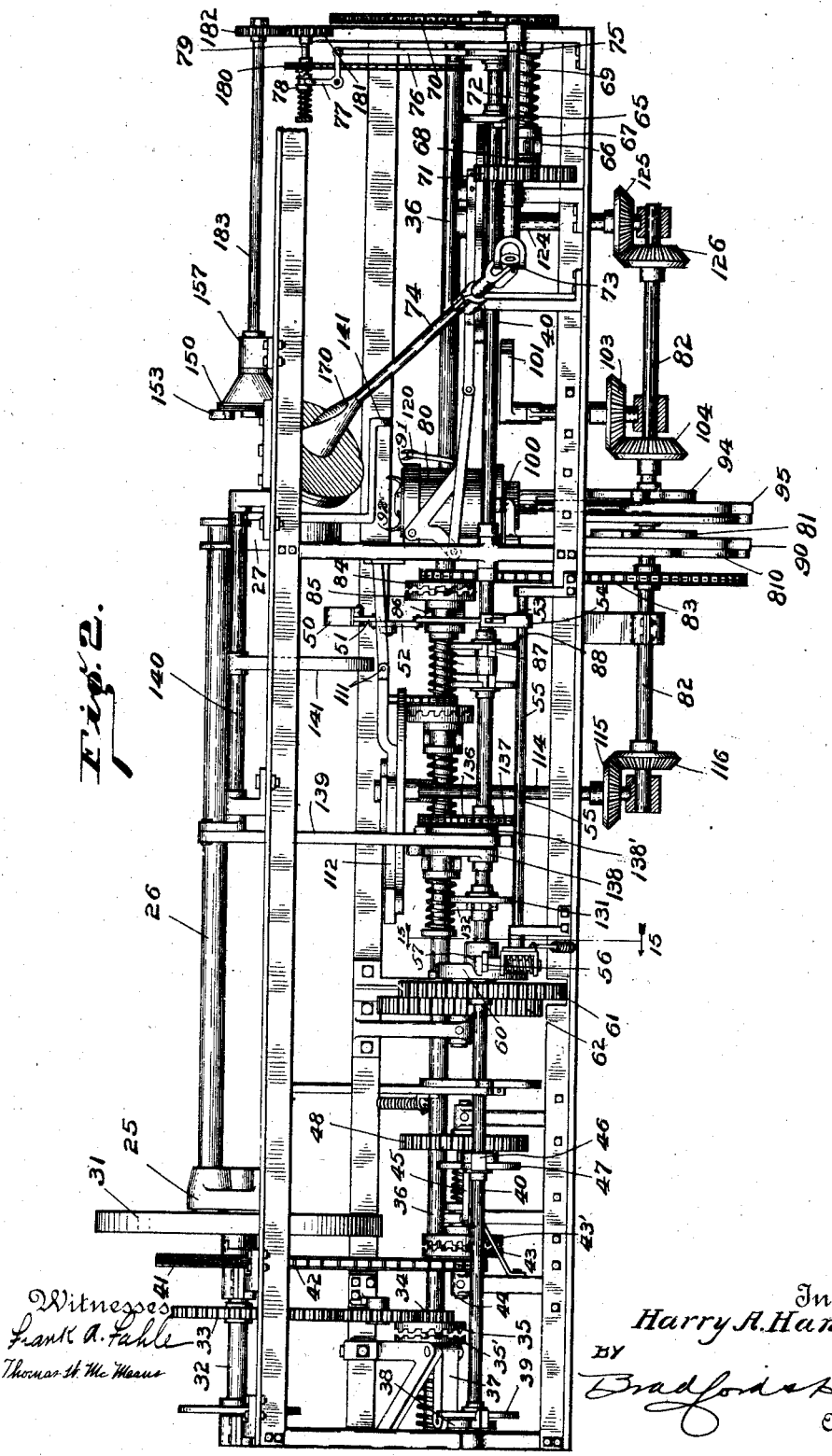

The accompanying drawings illustrate my invention:

Figure 1 is a plan of the rope forming and securing mechanism together with an ordinary packing mechanism for delivering the straw from the receiving table of an ordinary harvester to said mechanism; Fig. 2 is a front elevation of the parts shown in Fig. 1; Fig. 3 is a section, on an enlarged scale, on line 3—3 of Fig. 1;
Fig. 4 a perspective detail of the rope forming, twisting and tucking mechanism; Fig. 5 a vertical fragmentary detail of the twisting and tucking mechanism; Fig. 6 a detail of the twister and tucker with the twist completed; Fig. 7 a detail of the same parts shown in Fig. 6, showing an intermediate position thereof; Fig. 8 a similar view showing the final tucking position of such parts; Fig. 9 a vertical sectional detail of the twister head; Fig. 10 a detail of the rope forming head and straw extractor; Fig. 11 a section of the rope forming head on line 11—11 of Fig. 12; Fig. 12 a section on line 12—12 of Fig. 11; Fig. 13 a section of the extractor head on line 13—13 of Fig. 14; Fig. 14 a section on line 14—14 of Fig. 13; Fig. 15 is a sectional detail on line 15—15 of Fig. 2; Fig. 16 a detail of a modified twister head, and Fig. 17 a plan thereof.

The cut crop is delivered in any desired manner from a suitable cutting mechanism, to a table 20 and there either retarded by arms 21 or fed forward by packer arms 22 in the usual well known manner, the said mechanism being of any desired ordinary construction and therefore needing no special description in this case. The straw is fed forward into a revolving cradle which is composed of a cross-arm 25 and a pair of parallel tubular arms 26—26, a pair of mating semi-circular fingers 27, each of which is carried by one of a pair of shafts 28, one of said shafts being journaled in each of the parallel arms 26 and extending entirely therethrough, and provided at its further end with a mutilated gear 29 adapted to mesh with a mutilated gear 30 carried by a head 31 journaled upon a shaft 32, which shaft carries the cross-arm 25. Shaft 32 carries a gear 33 which meshes with a pinion 34 carried by a clutch member 35 journaled on the main drive shaft 36, said clutch member being adapted to be engaged by a corresponding clutch member 35′ splined upon shaft 36 and shifted by means of a lever 37. Lever 37 is operated by means of link 38 and a cam 39 carried by the time shaft 40. The head 31 may be independently rotated on shaft 32 by means of sprocket-wheel 41 carried by head 31 and connected by chain 42 with a clutch member 43 journaled on a counter-shaft 44. The clutch member 43 is adapted to coöperate with a clutch member 43′ splined upon the counter shaft 44 and controlled by a lever 45, link 46 and cam 47, carried by the time shaft 40. Counter-shaft 44 is continuously driven by means of a pair of gears 48 and 49 from the main shaft 36.

When a sufficient quantity of straw has been delivered to the cradle by the packing arms 22, a lever 50 is depressed by the incoming straw in the usual well known manner, and said lever through link 51, lever 52 and link 53 pushes against an arm 54 carried by a rock-shaft 55, which rock-shaft (see Fig. 15) carries a spring detent 56 which lies normally in the path of movement of a swinging pawl 57 carried by an arm 58 on the time shaft 40. When detent 56 is withdrawn the pawl 57 is thrown by its spring 57′ into mesh with an internally toothed ring 60 journaled upon the time shaft 40, said ring being carried by a gear 61 which is continuously driven by means of a train 62 from the main drive shaft 36. As soon as the time shaft 40 is connected with the main drive shaft, its first result is to swing lever 46 so as to connect head 31 with the main drive shaft, in a manner already described, and rotate the mutilated gear 30 one fourth of a revolution in the direction indicated by the arrow in Fig. 3 and thus engage that one of gears 29 which lies nearest the packer arms so as to swing the open finger 27, which theretofore has lain within a slot beneath table 20, over into coöperation with the closed finger 27, within which the straw has been packed, and thus clasping the bundle between the said two fingers, the bundle being prevented from rotation within the fingers by means of spuds 27′ which enter the bundle radially. As soon as this has occurred a cam 65 (Fig. 1) on the time shaft 40 operates upon an arm 66 to shift a clutch member 67 into engagement with a clutch member gear 68. Clutch member 67 is splined upon a shaft 69 continuously rotated by sprocket chain 70 from the main shaft 36 while clutch member 68 is a gear which meshes with a gear 71 carried by a shaft 72 connected by a universal joint 73 with the shaft 74 which shaft carries the rope-forming head, which will be described in detail hereafter. Shaft 40 also carries a cam 75 which operates upon a link 76 to shift a lever 77, said lever operating upon a clutch member 78 so as to connect a shaft 79 with a continuously rotating sprocket 180 journaled thereon. Shaft 79 is geared by gears 181 and 182 with a shaft 183 which carries the straw extracting head, which will be described in connection with the rope forming head. After a short period of preliminary rotation of the rope forming mechanism, shaft 40 operates through cam 39 and link 38 to connect shaft 32 with the main drive shaft and thus rotate the bundle carrying-cradle in the direction indicated by the arrows leading from shafts 28 in Fig. 3, the direction of this rotation being in a direction opposite to the preliminary movement of the mutilated gear 30. In the meantime cam 47 has operated to withdraw clutch member 43′ from engagement with clutch member 43 so that head 31 and mutilated gear 30 are free to rotate with the arm 25 of the bundle-carrying cradle.

The bundle-carrying cradle is rotated approximately one and one-half revolutions and during this time the rope forming mechanism has rotated, as will be described, to form from the butts of straws extracted from the bundle, a twisted rope encircling the bundle. As soon as the bundle-carrying cradle comes to a stop, the twister head 80 is raised vertically by means of the cam 81 carried by a shaft 82. The shaft 82 lies normally at rest and is connected by sprocket chain 83 with a clutch member 84 journaled upon the main drive shaft 36 and this clutch member 84 is adapted to be engaged by clutch member 85 splined upon the main drive shaft 36 and controlled by a lever 86 operated by a link 87 and a cam 88 carried by the time shaft 40. The cam 81 operates upon a slide 90 which engages a flange 80′ of the twister head. The twister head is journaled in a bracket 91 of the main frame, being vertically reciprocable through said bracket.

The twister head carries a pair of pivoted jaws 92 which are normally open, as shown in Fig. 9, and as the twister head is projected upward the jaws 92 are caused to straddle the adjacent overlapping ends of the rope 93 which has been formed around the bundle, as shown in dotted lines in Fig. 5. Thereupon a cam 94 carried by shaft 82 operates upon a stem 95 which projects upwardly into the twister head 80 and operates through links 96—96 to swing the twister jaws 92 together so as to firmly embrace the two overlapping ends of the rope 93, as shown in Fig. 6, whereupon cam 810, which is complementary to cam 81, operates upon slide 90 to pull the twister head 80 downward away from the bundle, the overlapping ends of the rope being pulled with said head, and a gear 100, carried by the twister head, being brought into the plane of movement of a segment 101 carried by a vertical shaft 102 driven by gears 103 and 104 from shaft 82, the twister head being thus rotated about a vertical axis one turn, thus twisting the two ends of the rope 93 together, as shown in Fig. 6. This twisting action pulls the initial end of the rope away from the bundle but, in view of the fact that the initial ends of the straws are intermingled with the other straws from the bundle, the result is merely to pull a bight of the initial end of the rope away from the bundle so that this initial end is doubled upon itself, as clearly indicated in Fig. 6. As soon as this twisting movement has been accomplished a finger 105 is driven axially of the bundle across the top of the twister head and into engagement with the twisted ends of the rope forcing said ends out of the twister head and upward toward the butt end of the bundle.

The finger 105 is provided at its outer end with a yoke 106 adapted to embrace the twisted ends of the rope 93 and carries a pair of spring fingers 107 which pass through slots 108 formed in the yoke. The spring fingers 107 also pass through an opening formed in a stationary guide 109 and each of the fingers carries a cam 110 which, when forced into the opening in guide 109, clamp the fingers 107 upon the twisted ends of the rope so as to hold them firmly for a short period. Finger 105 is pivoted at 111 to an operating slide 112 which is shifted by the cams 113 and 113′ carried by a shaft 114 driven by gears 115 and 116 from shaft 82. As soon as finger 105 has been projected in the manner already described a tucker finger 120 is swung upward about its pivot 120′ into engagement with the twisted ends of rope 93 and across said ends upward and forward into the bundle toward the head end thereof so that the twisted ends are tucked between the encircling rope and the body of the bundle, being thus held against displacement. While this action is taking place finger 105 is retracted to normal position and the tucker 120 is then returned to normal. Tucker 120 is operated by means of the link 121 connected to a cam slide 122 operated by cams 123 and 123′ carried by shaft 124 driven by gears 125 and 126 from shaft 82.

As soon as the twisting and tucking has been completed clutch 43′ is again thrown into engagement with clutch 43 so that head 31 is given another quarter revolution, thus bringing the internal teeth 130 thereof into engagement with the mutilated gear 29 which at the time lies close to the table 20, said gear carrying the finger 27 which lies over the bundle. The teeth 130 rotate the gear 29 which they engage, so as to swing the upper finger 27 to the position shown at the right in full lines in Fig. 3, thus opening the bundle-carrying cradle. Thereupon a cam 131 carried by the time shaft 40 operates upon a slide 132 to throw a lever 133, thus shifting a clutch member 134 (see dotted lines in Fig. 1) into engagement with a clutch member 135 journaled on the main drive shaft 36. The clutch member 135 is connected by a chain 136 with an ejector wheel 137, journaled in shaft 40 and carrying a pair of cams 138 and 138′, which operate upon a link 139 connected to a rock shaft 140. The rock-shaft 140 carries an ejector arm 141 which lifts the complete and tied bundle from the cradle and ejects it from the machine in the usual well known manner. The ejector finger returns immediately to normal position and pawl 57 comes into engagement with the trip 56 so as to withdraw the pawl from engagement with the internal teeth 58 and thus stop the rotation of the time shaft, the several parts being then in position for a repetition of the operation already described.

The binding rope is formed from the butt ends of straw lying upon the exterior of the bundle, the head ends being allowed to remain within the bundle, and the butt ends desired are extracted by means of the extractor carried by shaft 183. This extractor consists of a substantially circular disk 150 secured to the shaft 183 and, at one or more points, slightly flattened as at 151. Journaled in the disk adjacent each of the faces 151 is a rock shaft 152 which, at its outer end, carries a hookshaped finger 153, the hook end of which is adapted to be projected beyond the flattened portion 151 so as to engage the straws of the bundle. Each shaft 152 carries a finger 154 at its inner end, which finger is held by a spring 155 in engagement with a cam 156, which is held stationary in a bracket 157, the arrangement being such that the hooks 153 are automatically projected and retracted from the edge of the disk. Disk 150 is backed by a similar disk 150' rotatively adjustable thereon by screws 150'', the arrangement being such that, by shifting disk 150' on disk 150 the flattened portions 151 may be thrown out of register so as to reduce the effective projection of hooks 153 and thus reduce the number of straws carried to the twister. The butt ends of the straws extracted from the bundle by the fingers 153 are delivered thereby into a notch 160 extending radially into a stationary disk 161 carried by a bracket 162, the straws passing over a guide finger 163 into said notch 160. Journaled in the disk 161 is the twister head 170, said twister head having a circumferential flange 171 terminating in a long hook-like beak 172 which engages the straw in notch 160 and delivers the same into the axial opening 173 formed through the twister head, said axial opening being in the exact center of rotation of the head at the end adjacent the bundle and lying to one side of said center at the further end, in order that the straws entering the head may be twisted upon each other by the rotation thereof.

The passage beneath hook 172 into opening 173 is spiral in form and is considerably contracted immediately adjacent the opening 173, as at 173', in order that the straws may enter the opening 173 in a comparatively thin stream. It is necessary that the straws be held under some tension during the process of twisting and for this purpose I provide the twister head 170 with an interior chamber 174 within which I mount, upon each side of the axial opening 173, tension means, which in the present case consists of toggle levers 175 which may be urged toward the axis of the head by suitable springs 176, the tension of which may be adjusted by adjusting screws 177.

I claim as my invention:

1. In a machine of the class described, a bundle-forming cradle comprising a pair of curved fingers adapted to embrace the bundle, a pair of opposed parallel shafts each carrying one of said fingers, means for rocking either of said shafts, and means for revolving said shafts simultaneously about an axis intermediate said rock shafts.

2. In a machine of the class described, the combination with a bundle-holding cradle and means for rotating the same about the axis of the bundle, of means for extracting the butt ends of straws from the bundle during its rotation and twisting the same into a rope encircling the bundle, means for engaging the overlapping ends of such rope and twisting the same together radially of the bundle, and means for securing said twisted ends together.

3. In a machine of the class described, the combination with a bundle-holding cradle and means for rotating the same about the axis of the bundle, of means for extracting the butt ends of straws from the bundle during its rotation and twisting the same into a rope encircling the bundle, means for engaging the overlapping ends of such rope and twisting the same together radially of the bundle, and means for tucking said twisted ends between the encircling rope and the bundle.

4. In a machine of the class described, the combination with a bundle-holder and means for forming a binding rope around said bundle, of means for twisting the overlapping ends of such encircling band together radially of the bundle, and means for tucking such twisted ends into the bundle.

5. In a machine of the class described, the combination with a bundle-holder and means for forming a binding rope around said bundle from the ends of straws in the bundle, of means for twisting the overlapping ends of such encircling band together radially of the bundle, and means for tucking such twisted ends into the bundle.

6. In a machine of the class described, the combination with a bundle-receiving means and means for forming an encircling rope about said bundle, of a twister head comprising jaws adapted to clasp the overlapping ends of said embracing rope, and means for rotating said head about an axis substantially radial to the bundle.

7. In a machine of the class described, the combination with a bundle-receiving means and means for forming an encircling rope about said bundle from the ends of straws extracted from said bundle, of a twister head comprising jaws adapted to clasp the overlapping ends of said embracing rope, and means for rotating said head about an axis substantially radial to the bundle.

8. In a machine of the class described, the combination with a bundle-receiving means and means for forming an encircling rope about said bundle, of a twister head comprising jaws adapted to clasp the overlapping ends of said embracing rope, means for rotating said head about an axis substantially radial to the bundle, and means for tucking said twisted ends into the bundle.

9. In a machine of the class described, the combination with a bundle-receiving means and means for forming an encircling rope about said bundle from the ends of straws extracted from said bundle, of a twister head comprising jaws adapted to clasp the overlapping ends of said embracing rope, means for rotating said head about an axis substantially radial to the bundle, and means for tucking said twisted ends into the bundle.

10. In a machine of the class described, the combination with a bundle-receiving means and means for forming an encircling rope about said bundle, of a twister head comprising jaws adapted to clasp the overlapping ends of said embracing rope, means for rotating said head about an axis substantially radial to the bundle, a finger movable axially of the bundle, means for moving said finger axially of the bundle to shift the twisted ends of the embracing rope from the twisting jaws, a tucker finger, and means for driving said tucker finger into engagement with the deflected twisted ends of the rope and driving the same into the bundle.

11. In a machine of the class described, the combination with a bundle-receiving means and means for forming an encircling rope about said bundle from the ends of straws extracted from said bundle, of a twister head comprising jaws adapted to clasp the overlapping ends of said embracing rope, means for rotating said head about an axis substantially radial to the bundle, a finger movable axially of the bundle, means for moving said finger axially of the bundle to shift the twisted ends of the embracing rope from the twisting jaws, a tucker finger, and means for driving said tucker finger into engagement with the deflected twisted ends of the rope and driving the same into the bundle.

12. In a machine of the class described, the combination with a bundle-receiving means and means for forming an encircling rope about said bundle, of a twister head comprising jaws adapted to clasp the overlapping ends of said embracing rope, means for rotating said head about an axis substantially radial to the bundle, a finger movable axially of the bundle, means for moving said finger axially of the bundle to shift the twisted ends of the embracing rope from the twisting jaws, a pair of spring fingers carried by said last-mentioned finger, and means for clasping said fingers about the twisted ends of said rope, a tucker finger, and means for driving said tucker finger into engagement with the deflected twisted ends of the rope and driving the same into the bundle.

13. In a machine of the class described, the combination with a bundle-receiving means and means for forming an encircling rope about said bundle from the ends of straws extracted from said bundle, of a twister head comprising jaws adapted to clasp the overlapping ends of said embracing rope, means for rotating said head about an axis substantially radial to the bundle, a finger movable axially to the bundle, means for moving said finger axially of the bundle to shift the twisted ends of the embracing rope from the twisting jaws, a pair of spring fingers carried by said last-mentioned finger, and means for clasping said fingers about the twisted ends of said rope, a tucker finger, and means for driving said tucker finger into engagement with the deflected twisted ends of the rope and driving the same into the bundle.

14. In a machine of the class described, the combination with a bundle-holder, of a rope forming mechanism comprising a rotary twister head having an axial opening and a gathering finger delivering thereto, a rotary extractor head arranged adjacent the twister head, and means carried by said extractor head for extracting one end of straws from the bundle and delivering the same to the twister head.

15. In a machine of the class described, the combination with a bundle-holder, of a rope forming mechanism comprising a rotary twister head having an axial opening and a gathering finger delivering thereto, a rotary extractor head arranged adjacent the twister head, means carried by said extractor head for extracting one end of straws from the bundle and delivering the same to the twister head, and tension means carried by the twister head for yieldingly embracing the straws delivered thereto.

16. In a machine of the class described, the combination with a bundle-holder, of a rope forming mechanism comprising a rotary twister head having an axial opening and a gathering finger delivering thereto, and tension means carried by the twister head for yieldingly embracing the straws delivered thereto.

17. In a machine of the class described, the combination with a bundle-holder, of a rope forming mechanism comprising a rotary twister head having an axial opening and a gathering finger delivering thereto, a rotary extractor head arranged adjacent the twister head, means carried by said extractor head for extracting one end of straws from the bundle and delivering the same to the twister head, tension means mounted within said twister head and consisting of two pairs of hinged plates arranged in opposition to each other upon opposite sides of the axial opening in the twister head, and springs for urging said plates toward the axis of the twister head.

18. In a machine of the class described, the combination with a bundle-carrier, of a rotary extractor head, an extractor hook carried by said head and adapted to engage straws in the bundle and extract the same from the bundle, and means for shifting said extractor finger on the head, for the purpose set forth.

19. In a machine of the class described, the combination with a bundle-carrier, of a rotary extractor head, an extractor hook carried by said head and adapted to engage straws in the bundle carrier and extract the same from the bundle, means for shifting said extractor finger on the head, for the purpose set forth, and means for controlling the bite of the extractor finger.

20. In a machine of the class described, the combination with a bundle carrier and means for rotating the same about the axis of the bundle, of a rotary extractor head, an extractor hook pivotally mounted on said head, and means for swinging said hook upon the head during rotation thereof, for the purpose set forth.

21. In a machine of the class described, the combination with a rotary twister head having an axial opening and an extended gathering finger delivering thereto, of a rotary extractor head, an extractor hook carried by said head, and means for projecting and retracting said hook, for the purpose set forth.

22. In a machine of the class described, the combination with a rotary twister head having an axial opening and a transverse throat leading thereto, of a carrier plate within which said head is journaled, said plate having a throat extending inwardly to the twister throat, a rotary extractor head, an extractor hook pivoted on said head, and means for projecting and retracting said hook during the rotation of the extractor head, whereby material gathered by the hook may be delivered to the plate throat and thence to the twister head throat.

In witness whereof, I, have hereunto set my hand and seal at Indianapolis, Indiana, this 3rd day of October, A. D. one thousand nine hundred and six.

HARRY A. HANCOCK. [L. S.]

Witnesses:
ARTHUR M. HOOD,
THOMAS W. MCMEANS.